United States Patent [19]

Kielar et al.

[11] Patent Number: 4,970,913
[45] Date of Patent: Nov. 20, 1990

[54] VENTING MECHANISM

[75] Inventors: Stanley J. Kielar, Saginaw; Charles L. Rasmer, Bay City; Flave F. Stimpson, Saginaw, all of Mich.

[73] Assignee: General Motors Corporation, Detroit, Mich.

[21] Appl. No.: 383,902

[22] Filed: Jul. 21, 1989

[51] Int. Cl.⁵ .............................................. B65D 41/04
[52] U.S. Cl. .................................. 74/606 R; 55/185; 55/189; 74/607; 220/373
[58] Field of Search ............... 74/606 R, 607; 55/185, 55/189, 199; 220/373, 374

[56] References Cited

U.S. PATENT DOCUMENTS

| 3,314,306 | 4/1967 | Barclae | 74/606 R |
| 3,432,996 | 3/1969 | Patterson | 55/189 |
| 3,686,973 | 8/1972 | Davison, Jr. et al. | 74/606 R |
| 3,916,724 | 11/1975 | Muller et al. | 74/606 R |
| 4,151,761 | 5/1979 | Nishikawa et al. | 74/606 A |
| 4,351,203 | 9/1982 | Fukunaga | 74/606 R |
| 4,506,562 | 3/1985 | Yamaura et al. | 74/606 R |
| 4,554,844 | 11/1985 | Hamano | 74/606 R |
| 4,595,118 | 6/1986 | Azuma et al. | 220/374 |
| 4,794,942 | 1/1989 | Yasuda et al. | 137/197 |

Primary Examiner—Leslie A. Braun
Assistant Examiner—Scott Anchell
Attorney, Agent, or Firm—F. J. Fodale

[57] ABSTRACT

A venting mechanism for a drive axle assembly is mounted on a side wall of a housing for a differential. The venting mechanism includes a deflector vane which is pivotally mounted on a vent tube inside the housing. The deflector vane allows air to be vented from the housing through the vent tube without lubricant being able to escape.

10 Claims, 3 Drawing Sheets

VENTING MECHANISM

BACKGROUND OF THE INVENTION

This invention relates generally to venting mechanisms and more specifically to venting mechanisms for drive axle assemblies and the like.

A drive axle assembly is designed to transfer power. To do this a number of gears inside of a housing are used, and these gears need to be lubricated. When these gears operate, they generate heat and heat up surrounding lubricant and air, increasing air pressure inside the housing. Intense pressure build up can cause problems such as lubricant leakage which could lead to unnecessary gear wear. Consequently, drive axle assemblies and other gearing devices for transmitting power commonly use an air vent to relieve the pressure.

But the use of an air vent introduces another problem in that the air vent provides an escape path for the lubricant if the lubricant is near the air vent. Action of the gears inside of the housing, especially large gears which are partially submerged in the lubricant, compound the problem by churning and splashing the lubricant inside the housing. This creates possibilities of the lubricant coming in close contact with the air vent and escaping regardless of where the air vent is located.

Prior attempts to solve the problem of lubricant escape through an air vent are known. One known attempt places the air vent mechanism high above the level of lubricant so as to keep the lubricant away from the air vent, such as shown in the U.S. Pat. No. 4,554,844 granted to Hideo Hamano on Nov. 26, 1985. This patent discloses an air breather assembly 50 for a differential gear unit 26. The air breather assembly 50 includes an air breather plug 56, a vent hole 54 and a cover member 18. The air breather assembly 50 is placed high above the level of lubricant in a sump and it has an air passage which is designed to reduce the chance the lubricant has to escape. But problems can occur when the lubricant is splashed by gears directly at the air breather assembly. When this happens the lubricant could escape through the air breather assembly even though it is above the level of lubricant in the sump.

Another prior art attempt uses a fixed deflector to deflect lubricant and keep it away from the air vent, such as shown in U.S. Pat. No. 4,351,203 granted to Koichi Fukunaga on Sept. 28, 1982. This patent discloses a breather plug assembly 4 with a deflector 5 to deflect a flow of lubricant Q and keep it away from the breather plug assembly. The deflector 5 has four equiangularly spaced openings 55 in its walls. But problems could occur due to the fact that the deflector is fixed in one position. When the lubricant is splashed high or in different direction it could cause the lubricant to avoid the deflector and be forced out of the breather plug assembly.

SUMMARY OF THE INVENTION

An object of the present invention is to provide an improved venting mechanism for a drive axle assembly or the like which effectively prevents the escape of lubricant through the venting mechanism.

Another object of the invention is to provide an improved venting mechanism that can be mounted on a side wall of a gear housing for a gear assembly which churns and splashes lubricant inside the housing during operation.

Yet another object of the invention is to provide an improved venting mechanism which deflects lubricant away from its air passage regardless of the direction from which the lubricant is coming.

A feature of the invention is that the improved venting mechanism has a deflector vane that pivots to deflect an oncoming flow of lubricant and effectively prevents its escape.

Another feature of the invention is that the improved venting mechanism has a deflector vane which is easily incorporated in the venting mechanism.

Other objects and features of the invention will become apparent to those skilled in the art as disclosure is made in the following detailed description of a preferred embodiment of the invention which sets forth the best mode of the invention contemplated by the inventors and which is illustrated in the accompanying sheet(s) of drawing.

DETAILED DESCRIPTION OF THE PREFERRED EMBODIMENT

Figure 1:
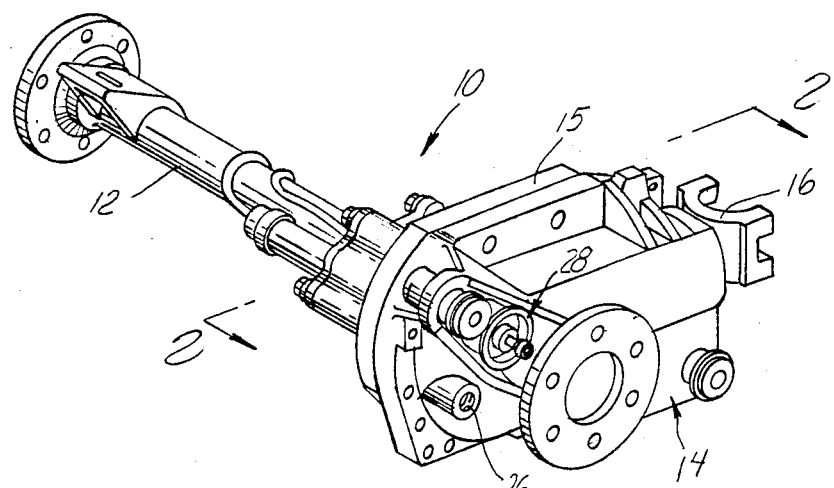
FIG. 1 is a perspective view of a drive axle assembly which is equipped with a venting mechanism in accordance with the invention.
Figure 3:
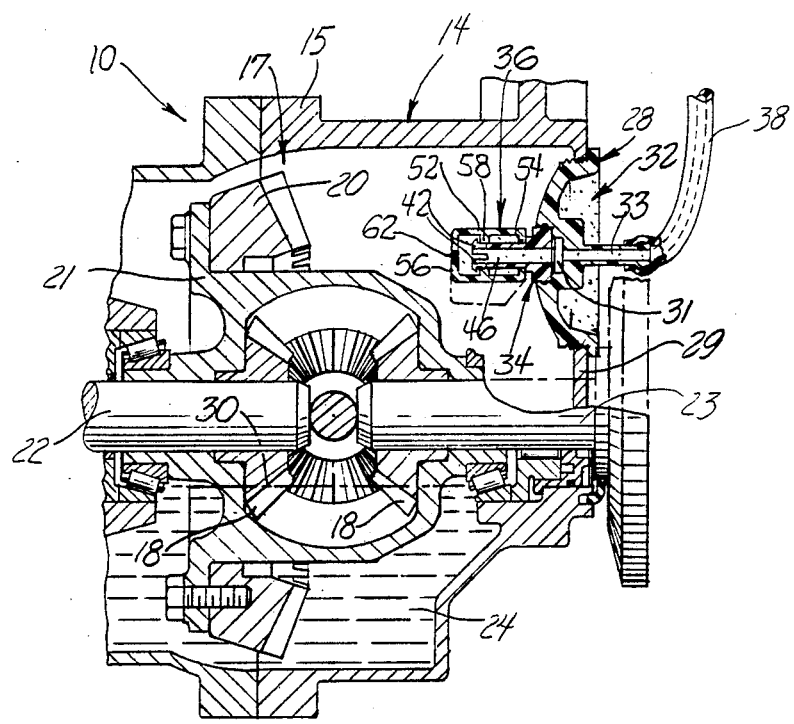
FIG. 3 is a sectional view taken substantially along line 3—3 of FIG. 2 looking in the direction of the arrows.
Figure 4:
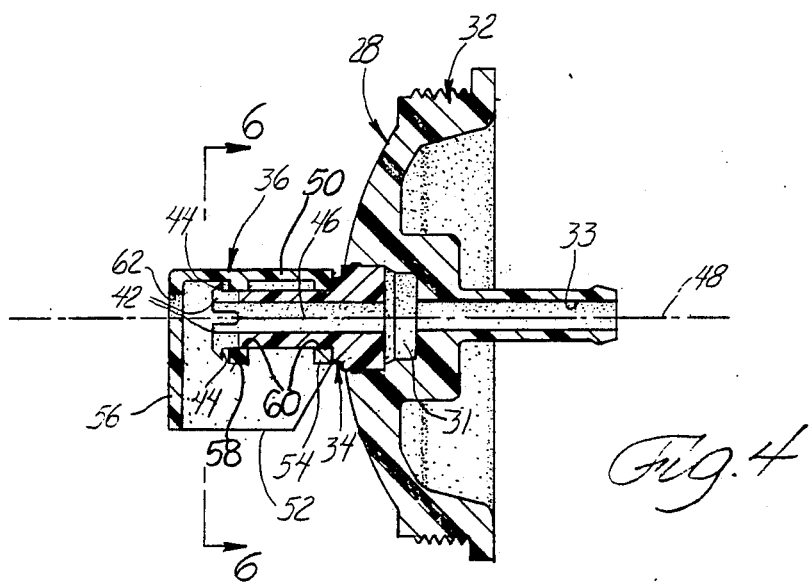
FIG. 4 is an enlarged view of the venting mechanism shown in FIG. 3.
Figure 5:
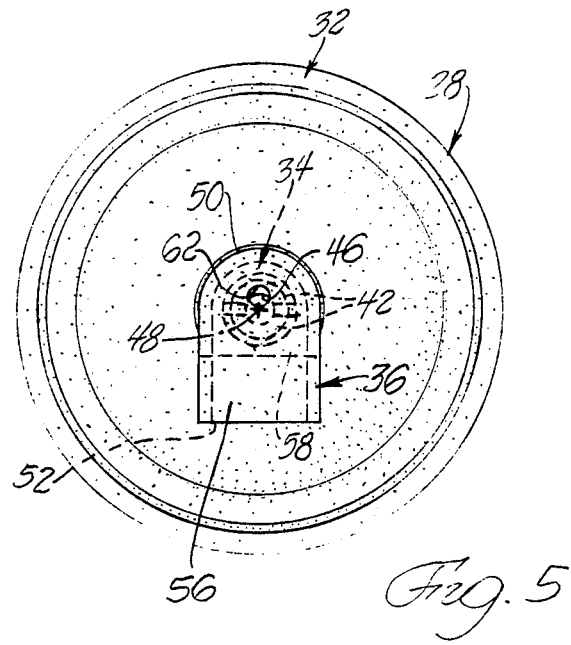
FIG. 5 is an end view of the venting mechanism shown in FIG. 4.
Figure 6:
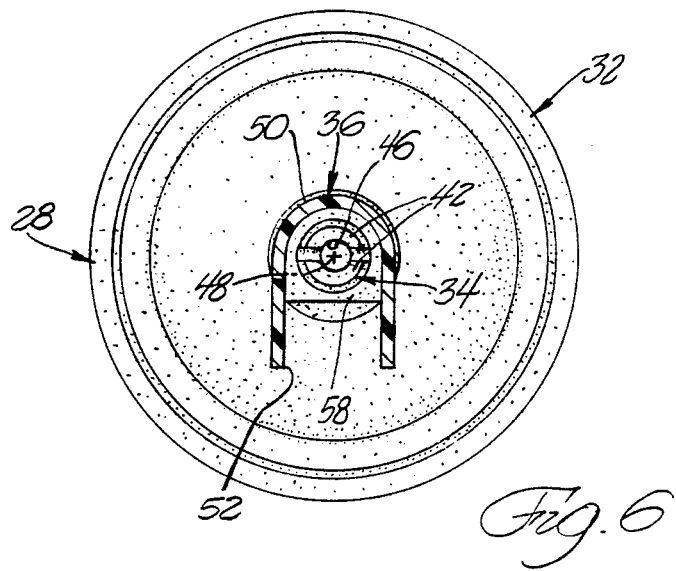
FIG. 6 is a sectional view taken along line 6—6 of FIG. 4 and looking in the direction of the arrows.

Referring now to the drawings, a drive axle assembly 10 for a front axle of a four wheel drive vehicle is illustrated in FIG. 1. The drive axle assembly 10 comprises an axle housing 12 and a differential unit 14. The differential unit 14 comprises a gear housing 15 and an input shaft 16 which extends into the gear housing 15 to drive a large ring gear 20 of a gear assembly 17. The ring gear 20 is attached to a case 21 which rotatably supports differential gears 18 which drive output shafts 22 and 23. The gear housing 15 has an interior which is filled with a lubricant 24 through a lubricant fill access 26 up to a predetermined level 30 in a sump area inside the housing as shown in FIG. 3.

The differential unit 14 also has a venting mechanism 28 which is mounted on a side wall 29 of the gear housing 15. The venting mechanism 28 faces the teeth of the ring gear 20, and is above the predetermined level 30 of the lubricant 24 in the sump area.

When in operation, the differential gears 18, ring gear 20 and case 21 rotate in the gear housing 15. Because the differential gears 18, ring gear 20 and case 21 are partially submerged in the lubricant 24, the lubricant is splashed around inside the gear housing 15, and a flow of lubricant Q is created in the gear housing above the predetermined level 30 of lubricant 24 in the sump. This flow of lubricant Q passes by the venting mechanism 28 which vents air to release pressure but which effectively prevents lubricant escape through the venting mechanism 28.

The venting mechanism 28 comprises a two piece tube member 31, in the form of a vent hose connector 32 and a vent tube 34, and a deflector vane 36.

The vent hose connector 32 is mounted on the side wall 29 of the gear housing 15 and it has a first air passage 33 which leads from the interior of the gear housing 15 through the side wall 29 of the gear housing 15. A hose 38 is attached to the vent hose connector 32 outside of the gear housing 15. The hose 38 has an open end outside of the gear housing 15 which is raised up to prevent water and other contaminants from entering the gear housing 15 through the vent hose connector 32.

The vent tube 34 has a second air passage 46 and defines an axis of rotation 48 for the deflector vane 36. The vent tube 34 is attached to the vent hose connector 32 so that the air passage 46 forms a continuation of the air passage 33 inside the housing. An inner end of the vent tube is slotted diametrically to form two flexible fingers 42. Each of the flexible fingers 42 has a catch 44. The flexible fingers 42 and the catches 44 allow the deflector vane 36 to be snap assembled onto the vent tube 34.

The deflector vane 36 is pivotally attached to the vent tube 34 so that it covers the open end of the air passage 33 and is able to rotate 360° about the axis of rotation 48. The deflector vane 36 has a peripheral wall 50, an outer end wall 54, and inner end wall 56 which define an opening 52, and an intermediate wall 58. The inner end wall 56 is more toward the interior of the housing 15 and the outer end wall 54 is more toward the exterior of the housing 15. The peripheral wall 50 is elongated and shaped so that the deflector vane 36 pivots in the lubricant flow Q so that the opening 52 is always in an extreme downstream position in the lubricant flow Q.

To attach the deflector vane 36 to the vent tube 34, the outer end wall 54 and the intermediate wall 58 each have bearing holes 60 sized to fit over the vent tube 34. The deflector vane 36 is snap assembled onto the inner end of the vent tube 34 and retained by the catches 44 which cooperate with the intermediate wall 58.

The inner end wall 56 is spaced inwardly from the open end of the vent tube 34 and has a vent hole 62 which is aligned with the air passages 33 and 46. The diameter of vent hole 62 is smaller than the diameter of the air passages 33 and 46. The center of the vent hole 62 is located farther away from the opening 52 than the axis of rotation 48 is located from the opening 52.

Figure 2:
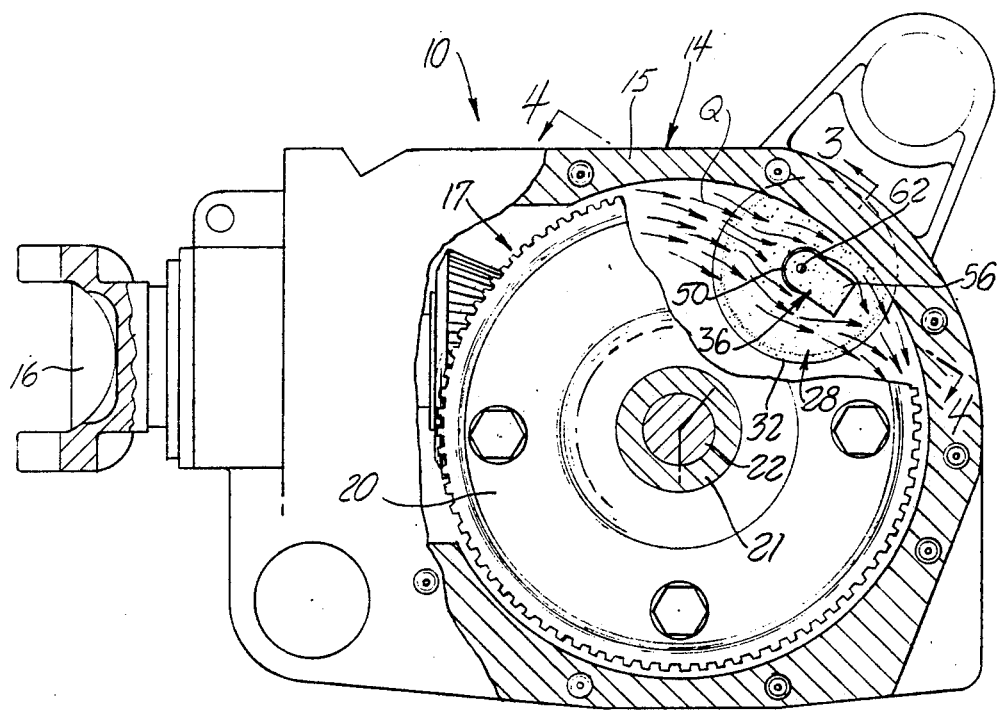
FIG. 2 is a partially sectioned view taken substantially along line 2—2 of FIG. 1 looking in the direction of the arrows.

When the differential gears 18, ring gear 20 and case 21 rotate they splash and churn the lubricant 24 and set up the lubricant flow Q above the predetermined level 30 of lubricant 24 in the sump area. This causes the lubricant flow Q to pass by the venting mechanism 28 as shown in FIG. 2. The deflector vane 36, being disposed in the lubricant flow Q, rotates in the manner of a weather vane so that the opening 52 is in an extreme downstream position in the lubricant flow Q. Since the deflector vane 36 is able to rotate 360°, no matter which direction the lubricant flow Q is coming from or how high it is splashed, the deflector vane 36 can rotate so that the opening 52 is in the downstream position in the lubricant flow Q. When the opening 52 is in the extreme downstream position air is able to pass in and out of the gear housing 15 through the air passages 33 and 46 without the lubricant passing out of the gear housing 15.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A venting mechanism for a drive axle assembly or the like having
  a housing with an interior and an exterior,
  a gear assembly arranged in the housing, the housing being filled with a lubricant up to a predetermined level, and
  a flow of the lubricant being formed in the housing above the predetermined level when the gear assembly is operated,
  the venting mechanism comprising:
  a tube member mounted on the housing above the predetermined level and extending through a wall of the housing to allow for passage of air between the interior and the exterior of the housing, and
  a deflector vane pivotally attached at an open end of the tube member in the interior of the housing to prevent passage of lubricant out of the housing through the open end of the tube member.

2. A venting mechanism for a drive axle assembly or the like having
  a housing with an interior and an exterior,
  a gear assembly arranged in the housing,
  the housing being filled with a lubricant up to a predetermined level, and
  a flow of the lubricant being formed in the housing above the predetermined level of lubricant when the gear assembly is operated,
  the venting mechanism comprising:
  a tube member mounted on a side wall of the housing above the predetermined level,
  the tube member having an open end in the interior of the housing, and extending through the side wall of the housing to allow for passage of air between the interior and the exterior of the housing, and
  a deflector vane pivotally attached to the tube member and covering the open end of the tube member inside the housing,
  the deflector vane having an opening and being shaped such that the deflector vane pivots in the flow of lubricant so that the opening is in a downstream position in the flow of lubricant to prevent passage of lubricant out of the housing through the open end of the tube member.

3. A venting mechanism for a drive axle assembly or the like having
  a housing with an interior and an exterior,
  a gear assembly arranged in the housing, and
  the housing being filled with a lubricant up to a predetermined level and,
  a flow of the lubricant being formed in the housing above the predetermined level when the gear assembly is operated,
  the venting mechanism comprising:
  a tube member mounted on a side wall of the housing above the predetermined level,
  the tube member having an open end in the interior of the housing, and extending through the side wall of the housing to allow for passage of air between the interior and the exterior of the housing, and a deflector vane pivotally attached to the open end of the tube member so that the deflector vane will pivot freely for 360°, the deflector vane having, a peripheral wall which is disposed in the flow of lubricant, the deflector vane having an inner end wall which is integrally attached to a side of the peripheral wall which is inwardly of the open end of the tube member toward the interior of the housing, the inner end wall being spaced from the open end of the tube member, and having a vent hole which is aligned with the open end of the tube member, the deflector vane having an outer end wall integrally attached to an opposite side of the peripheral wall toward the exterior of the housing, and an intermediate wall between the inner end wall and the outer end wall, the peripheral wall, the inner end wall and the outer end wall define an opening, the peripheral wall being shaped such that the deflector vane will pivot in the flow of lubricant so that the opening is in an extreme downstream position in the flow of lubricant to prevent the passage of lubricant out of the housing through the open end of the tube member, the inner end wall and the intermediate wall, each having a bearing hole for pivotally attaching the deflector vane to the tube member.

4. The venting mechanism as defined in claim 3 wherein the tube member has an inner diameter and the vent hole has a diameter which is less than the inner diameter of the tube member.

5. The venting mechanism as defined in claim 4 wherein the tube member defines an axis of rotation for the deflector vane and the vent hole has a center which is located farther away from the opening of the deflector vane than the axis of rotation is from the opening.

6. The venting mechanism as defined in claim 5 wherein the deflector vane is snap assembled onto the open end of the tube and the open end of the tube includes flexible fingers and catches which cooperate with the intermediate wall to retain the deflector vane.

7. A deflector vane for a venting mechanism which is disposed in a housing of a drive axle assembly or the like, the housing having an interior and an exterior, a gear assembly arranged in the interior of the housing, which forms a flow of lubricant when the gear assembly is operated, the venting mechanism having, a tube member mounted on a side wall of the housing which has an open end in the interior of the housing which extends through a side wall of the housing to allow for passage of air between the interior and the exterior of the housing, and the deflector vane comprising:

a peripheral wall, the deflector vane having an inner end wall which is integrally attached to a side of the peripheral wall toward the interior of the housing and which has a vent hole, the deflector vane having an outer end wall integrally attached to an opposite side of the peripheral wall toward the exterior of the housing, and an intermediate wall between the inner end wall and the outer end wall, the peripheral wall, the inner end wall and the outer end wall define an opening, the peripheral wall being shaped such that the deflector vane will pivot in the flow of lubricant so that the opening is in an extreme downstream position in the flow of lubricant to prevent the passage of lubricant into the opening, the inner end wall and the intermediate wall, each having a bearing hole for pivotally attaching the deflector vane to a tube member so that the inner end wall is spaced inwardly of an open end of the tube member.

8. The deflector as defined in claim 7 wherein the bearing holes define an axis of rotation for the deflector vane and the vent hole has a center which is located farther away from the opening of the deflector vane than the axis of rotation is from the opening.

9. The deflector as defined in claim 7 wherein the vent hole has a diameter which is less than the inner diameter of the tube member.

10. The deflector as defined in claim 9 wherein the bearing holes define an axis of rotation for the deflector vane and the vent hole has a center which is located farther away from the opening of the deflector vane than the axis of rotation is from the opening.

* * * * *